(12) United States Patent
Sato et al.

(10) Patent No.: US 9,557,045 B2
(45) Date of Patent: Jan. 31, 2017

(54) LIGHT SOURCE DEVICE

(71) Applicants: Yukio Sato, Tokyo (JP); Mitoru Yabe, Tokyo (JP); Shigetoshi Ipposhi, Tokyo (JP)

(72) Inventors: Yukio Sato, Tokyo (JP); Mitoru Yabe, Tokyo (JP); Shigetoshi Ipposhi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 15 days.

(21) Appl. No.: 13/781,439

(22) Filed: Feb. 28, 2013

(65) Prior Publication Data

US 2013/0258666 A1    Oct. 3, 2013

(30) Foreign Application Priority Data

Mar. 28, 2012    (JP) ................. 2012-074139

(51) Int. Cl.

| | | |
|---|---|---|
| *F21V 29/02* | (2006.01) | |
| *H04N 9/31* | (2006.01) | |
| *G03B 21/16* | (2006.01) | |
| *F21V 29/67* | (2015.01) | |

(52) U.S. Cl.
CPC ........... *F21V 29/025* (2013.01); *F21V 29/673* (2015.01); *G03B 21/16* (2013.01); *H04N 9/3144* (2013.01)

(58) Field of Classification Search
CPC .... F21V 29/025; F21V 29/20; F21V 29/2206; F21V 29/26; F21V 29/262; F21V 29/02; F21V 29/022; F21V 29/673; F21V 29/677; F21V 29/83; F21S 48/32; F21S 48/325;G03B 21/13; G03B 21/2033; G03B 21/16; G03B 21/145; H04N 9/3144

USPC ................... 362/294, 373, 249.01, 218, 554, 555,362/547; 353/52, 57; 361/679.49, 694–695; 165/80.3

See application file for complete search history.

(56) References Cited

U.S. PATENT DOCUMENTS

| | | | | |
|---|---|---|---|---|
| 5,093,769 A  * |  3/1992 | Luntsford | ..................... | 362/269 |
| 7,147,109 B2 * | 12/2006 | Stichert et al. | ............... | 209/315 |
| 7,157,838 B2 * |  1/2007 | Thielemans et al. | .......... | 313/35 |
| 8,094,447 B2 * |  1/2012 | Kise et al. | ............... | 361/679.49 |
| 8,330,337 B2 * | 12/2012 | Yu et al. | ......................... | 313/46 |
| 8,651,704 B1 * |  2/2014 | Gordin | ................. | G06F 19/705 |
| | | | | 362/145 |

(Continued)

FOREIGN PATENT DOCUMENTS

| | | |
|---|---|---|
| JP | 57-201099 A | 12/1982 |
| JP | 2001-15968 A |  1/2001 |

(Continued)

*Primary Examiner* — Anh Mai
*Assistant Examiner* — Arman B Fallahkhair
(74) *Attorney, Agent, or Firm* — Birch, Stewart, Kolasch & Birch, LLP (57) ABSTRACT

A light source device includes an outer housing, a partitioning member for forming a multi-stage structure in the outer housing, thereby partitioning each stage, a plurality of light source units disposed in respective stages of the outer housing, each of which has light source members and a heat pump unit for cooling the light source members, an opening portion for taking air acting as cooling air to be supplied to a cooling body from an outer part of the outer housing into an inner part thereof, and an opening portion formed along arrangement of the light source units in the partitioning member.

4 Claims, 9 Drawing Sheets

(56) References Cited

U.S. PATENT DOCUMENTS

| | | | | |
|---|---|---|---|---|
| 8,967,828 B2* | 3/2015 | Kijima | ............... | F21V 29/004 362/249.01 |
| 2004/0208009 A1* | 10/2004 | Mardon | ............... | F21K 9/00 362/373 |
| 2011/0181842 A1* | 7/2011 | Kanno et al. | ............... | 353/52 |
| 2011/0292656 A1* | 12/2011 | Saxena | ............... | 362/249.02 |
| 2013/0335993 A1* | 12/2013 | Yabe | ............... | G02B 6/0005 362/554 |

FOREIGN PATENT DOCUMENTS

| | | | |
|---|---|---|---|
| JP | 2010-256558 A | 11/2010 | |
| JP | 2011-154855 A | 8/2011 | |

\* cited by examiner

LIGHT SOURCE DEVICE

BACKGROUND OF THE INVENTION

Field of the Invention

The present invention relates to a light source device and more particularly to a cooling structure for a light source member having a laser device, a light emitting diode device or the like.

Description of the Background Art

Referring to the light source device, conventionally, there are proposed various techniques for cooling a light source member having a laser device, a light emitting diode device or the like. For example, Japanese Patent Application Laid-Open No. 2011-154855 describes a cooling mechanism of an air cooling type that feeds cooling air in a direction in which a plurality of light source members is disposed in an outer housing in a light source device to be used in a projection type video display device.

In the case in which the cooling mechanism of the air cooling type is employed in a light source device in which a multi-stage structure is formed in an outer housing and a plurality of light source members is disposed in each stage, however, cooling air is fed in the direction in which the light source members are disposed in each stage. For this reason, in the case in which the light source members are disposed in a longitudinal direction of each stage in the outer housing, for example, it is necessary to have a large amount of flow with respect to a relatively small sectional area in an air duct of the outer housing. As a result, a flow rate of the cooling air is increased so that a pressure loss is increased in a fluid system for exhausting heat. Therefore, there is a problem in that a cooling efficiency is reduced.

SUMMARY OF THE INVENTION

It is an object of the present invention to enhance a cooling efficiency in a light source device of an air cooling type having a multi-stage structure.

The light source device according to the present invention includes an outer housing, a partitioning member for forming a multi-stage structure in the outer housing, thereby partitioning each stage, and a plurality of light source units disposed in respective stages of the outer housing, each of which has a light source member and a cooling body for cooling the light source member. Furthermore, the light source device includes a first opening portion for taking air acting as cooling air to be supplied to the cooling body from an outer part of the outer housing into an inner part thereof, and a second opening portion formed along arrangement of the light source units in the partitioning member.

According to the light source device in accordance with the present invention, the second opening portion is formed along the arrangement of the light source units in the partitioning member for partitioning each stage. Therefore, the cooling air taken from the outside flows from a lower stage to an upper stage through the second opening portion. Thus, the cooling air flows to a relatively large sectional area in an air duct of the outer housing. Consequently, a pressure loss in the air duct of the outer housing is reduced so that a cooling efficiency can be enhanced.

These and other objects, features, aspects and advantages of the present invention will become more apparent from the following detailed description of the present invention when taken in conjunction with the accompanying drawings.

DESCRIPTION OF THE PREFERRED EMBODIMENTS

First Preferred Embodiment

Figure 1:
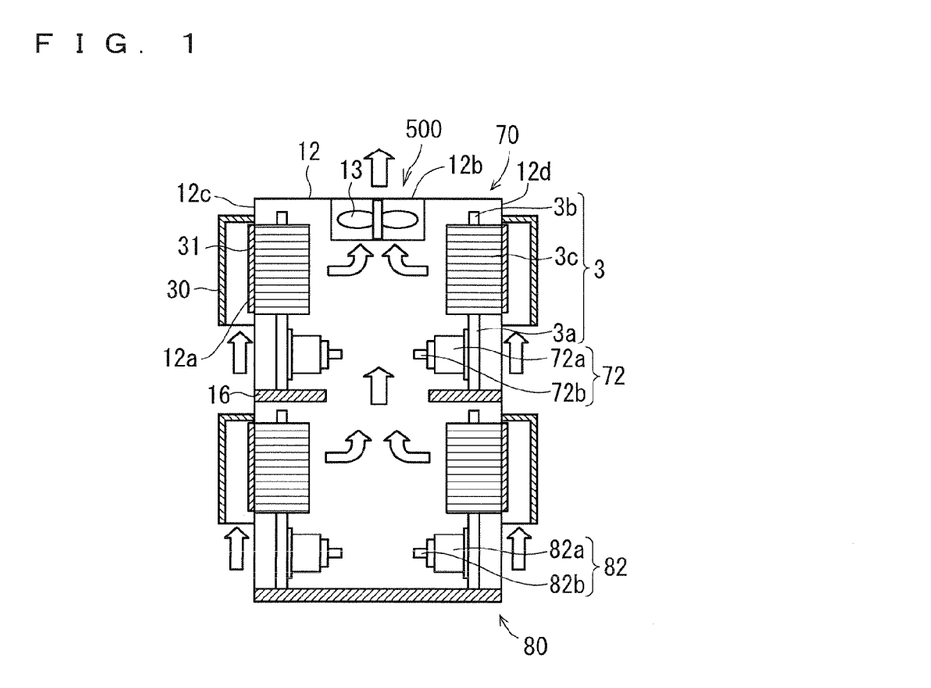
FIG. 1 is a cross-sectional view showing a light source device according to a first preferred embodiment.
Figure 2:
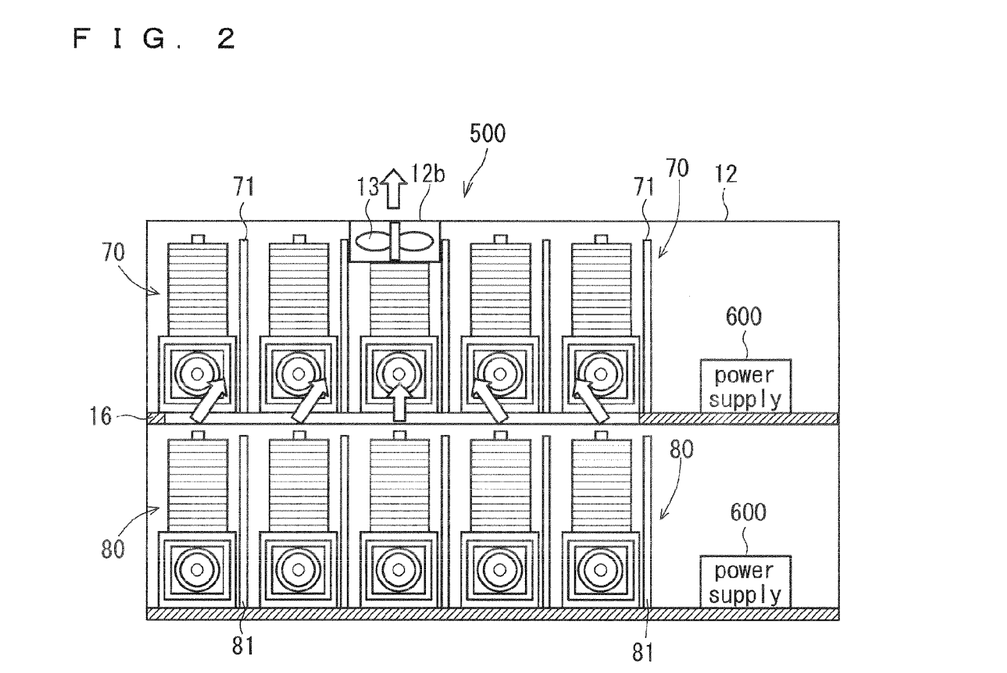
FIG. 2 is a longitudinal sectional view showing the light source device according to the first preferred embodiment.

A first preferred embodiment according to the present invention will be described below with reference to the drawings. FIGS. 1 and 2 are a cross-sectional view and a longitudinal sectional view showing a light source device 500 according to the first preferred embodiment of the present invention, respectively. The light source device 500 includes an outer housing 12 taking a shape of a rectangular parallelepiped, for example, a partitioning member 16 for forming a multi-stage structure and partitioning each stage in the outer housing 12, light source units 70 and 80 arranged in the respective stages of the outer housing 12, an opening portion 12a (a first opening portion) formed on the outer housing 12, and an opening portion 16a (a second opening portion) formed along the arrangement of the light source units 70 in the partitioning member 16.

In the outer housing 12, the opening portions 12a for taking cooling air from an outside of the outer housing 12 into an inside thereof are formed for two side plates 12c and 12d which face each other, and a filter 31 and a shade cover 30 are attached to an outside of the opening portion 12a, respectively. Moreover, a cooling fan 13 is attached to an inner part of the outer housing 12 (more specifically, an inside of a top plate of the outer housing 12). When the cooling fan 13 is rotated, air on the outside of the outer housing 12 is taken, as cooling air, from the opening portions 12a to the inner part of the outer housing 12. The cooling air taken into the outer housing 12 cools the light source units 70 and 80 provided in the outer housing 12 and is discharged from a discharge opening portion 12b to the outside of the outer housing 12. It is assumed that an arrow shown in the drawing indicates a direction in which the cooling air flows.

Next, description will be given to the light source units 70 and 80 which are accommodated in the outer housing 12. In the present preferred embodiment, the inner part of the outer housing 12 is constituted by two stages. In the outer housing 12, for example, ten first light source units 70 are disposed in an upper stage part to be an upper stage and ten second light source units 80 are disposed in a lower stage part to be a lower stage. In the upper stage part, five of the ten first light source units 70 are disposed in a line along the side plate 12c of the outer housing 12, and five residual light source units 70 are disposed in a line along the side plate 12d of the outer housing 12. The first light source unit 70 includes a first light source member 72 for outputting a red laser, for example, a heat pipe unit 3 (a cooling body) for cooling the first light source member 72, and a first driving substrate 71 on which a driving circuit (not shown) is provided.

On the other hand, also in the lower stage portion, ten second light source units 80 are disposed in the same manner as in the upper stage portion. The second light source unit 80 includes a second light source member 82 for outputting a green laser, for example, a heat pipe unit 3 (a cooling body) for cooling the second light source member 82, and a second driving substrate 81 on which a driving circuit (not shown) is provided. Necessary electric power for an operation of each driving circuit is supplied to the first driving substrate 71 and the second driving substrate 81 from a power supply 600 disposed in each stage of the outer housing 12. The first driving substrate 71 or the second driving substrate 81 is not indispensable and the light source members 72 and 82 are directly driven through the power supply 600 depending on a design in some cases.

The first light source member 72 is constituted by a first light source body portion 72a having a light emitting device for emitting red light, for example, and a first light source tip portion 72b for outputting the red light generated by the first light source body portion 72a. The light emitting device provided in the first light source body portion 72a is a laser device, for example. The light emitting device may be a light emitting diode. An optical fiber or the like is attached to the first light source tip portion 72b.

The second light source member 82 is constituted by a second light source body portion 82a having a light emitting device for emitting green light, for example, and a second light source tip portion 82b for outputting the green light generated by the second light source body portion 82a. The light emitting device provided in the second light source body portion 82a is a laser device, for example. The light emitting device may be a light emitting diode. An optical fiber or the like is attached to the second light source tip portion 82b.

The optical fibers are bundled and pulled to the outside of the outer housing 12 from the top plate of the outer housing 12, for example. Consequently, red and green laser beams output from the light source units 70 and 80 are taken to the outside of the outer housing 12. The red and green laser beams output from the light source device 500 are used as light sources in a display device such as a projector.

The heat pipe unit 3 includes a heat block 3a, at least one heat pipe 3b and a plurality of fins 3c, respectively.

In the first light source unit 70, the heat pipe unit 3 comes in contact with the first light source member 72 at the heat block 3a and absorbs heat generated by the first light source member 72 to cool the first light source member 72. In the second light source unit 80, similarly, the heat pipe unit 3 comes in contact with the second light source member 82 at the heat block 3a and absorbs heat generated by the second light source member 82 to cool the second light source member 82.

Five opening portions 12a are formed in corresponding positions to the upper stage portions of the side plates 12c and 12d in the outer housing 12 respectively, and five opening portions 12a are formed in corresponding positions to the lower stage portions of the side plates 12c and 12d in the outer housing 12 respectively. The first and second light source units 70 and 80 are disposed in positions in which the heat pipe unit 3 is opposed to the opening portion 12a.

Figure 3:
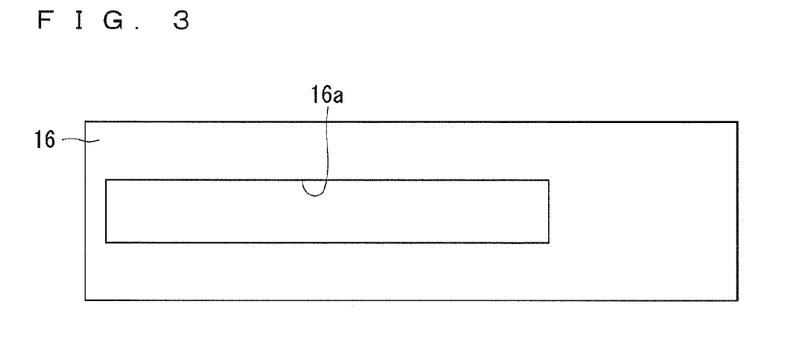
FIG. 3 is a plan view showing a partitioning member.
Figure 4:
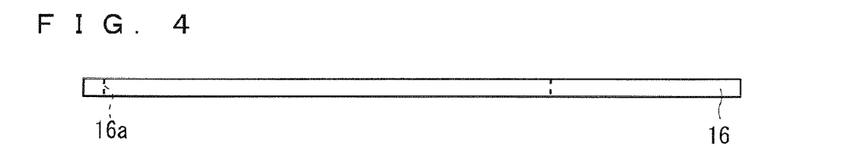
FIG. 4 is a side view showing the partitioning member.

Next, the partitioning member 16 will be described. FIGS. 3 and 4 are plan and side views showing the partitioning member 16, respectively. The partitioning member 16 is disposed between the upper stage portion to be an upper stage and the lower stage portion to be a lower stage in the outer housing 12, and the first light source unit 70 is disposed on the upper surface of the partitioning member 16. The slit-like opening portion 16a is formed along the arrangement of the light source units 70 in a central part of the partitioning member 16. As shown in FIGS. 3 and 4, the cooling air taken from the opening portion 12a into a portion between the fins 3c of the heat pipe units 3 in the lower stage portion is discharged from the discharge opening portion 12b via the slit-like opening portion 16a formed on the partitioning member 16.

A pressure loss $\Delta Pi$ in each portion of the air duct is expressed in the following equation.

$$\Delta Pi = \xi i \cdot vi^2 \cdot \gamma i/(2g)$$

$$vi = Qi/Si$$

$\xi i$ represents a loss coefficient of a fluid path, $vi$ represents a flow rate, $\gamma i$ represents a specific weight of air, g represents a gravitational acceleration, $Qi$ represents a flow rate of a fluid system, and $Si$ represents a sectional area of each portion in the fluid system. Moreover, a total pressure loss $\Delta Ptotal$ is expressed as follows.

$$\Delta Ptotal = \Sigma \xi i \cdot vi^2 \cdot \gamma i/(2g)$$

With the relationship, it is apparent that the pressure loss is proportional to a square of the flow rate and the flow rate is inversely proportional to the sectional area of the flow path in a system having a certain flow amount.

In a fluid system design in cooling using the heat pipe unit 3, generally, a pressure loss is necessarily increased in a passage through the fin 3c. The reason is as follows. In order to efficiently carry out cooling, a pitch between the fins 3c is to be reduced down to 1 to 2 mm, while air having a flow rate of 0.5 to 1.5 m/s is to flow. In order to control a load (a pressure loss or electric power) on the cooling fan 13, a size or the like, thereby causing air for efficiently carrying out the cooling to flow, it is important to devise reduction in a pressure loss in the other portions in addition to the design of the heat pipe unit 3. According to the present invention, in the partitioning member 16, it is possible to set a large sectional area Si of a flow path system with the discharge of the cooling air by forming the slit-like opening portion 16a along the arrangement of the first light source units 70. Thus, the present invention is successful in reduction in a pressure loss and a load which are required for the cooling fan 13.

Figure 5:
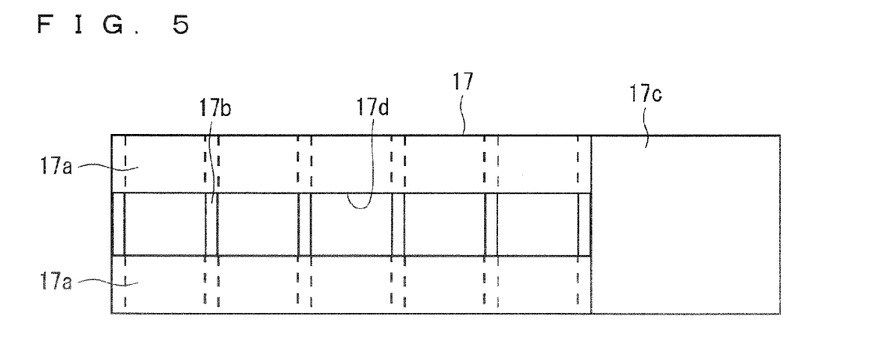
FIG. 5 is a plan view showing a partitioning member according to another example.
Figure 6:
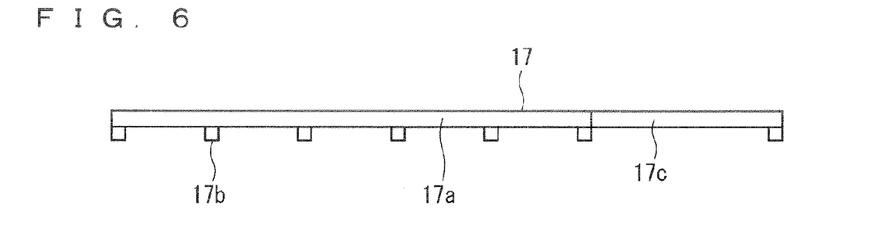
FIG. 6 is a side view showing the partitioning member according to another example.

Next, another example of the partitioning member will be described. FIGS. 5 and 6 are plan and side views showing a partitioning member 17 according to another example, respectively. The partitioning member 17 is constituted by a side plate 17a, a support portion 17b, an end plate 17c and an opening portion 17d. In some cases in which the partitioning member is constituted as shown in FIGS. 3 and 4, the opening portion 16a is formed along the arrangement of the first light source units 70 so that the partitioning member 16 has an insufficient strength for supporting the light source unit 70 in the upper stage portion. In those cases, it is also possible to employ a structure in which the side plate 17a is supported by the support portions 17b.

In these cases, a part of the opening portion 17d of the partitioning member 17 is closed by the support portions 17b. However, a width of the support portion 17b is smaller than an area of the opening portion 17d. For this reason, it is possible to realistically disregard the influence. Consequently, the sectional area Si of the flow path system can be maintained sufficiently. Thus, the effect of the present invention can be prevented from being suppressed.

Although the color of the light output from the first light source member 72 is caused to be different from the color of the light output from the second light source member 82 in the present preferred embodiment, they may be identical to each other. In this case, the first light source member 72 and the second light source member 82 can be set to have the same structure, and the first driving substrate 71 and the second driving substrate 81 can be set to have the same structure. Accordingly, it is possible to form the first light source unit 70 and the second light source unit 80 with the same structure.

Figure 7:
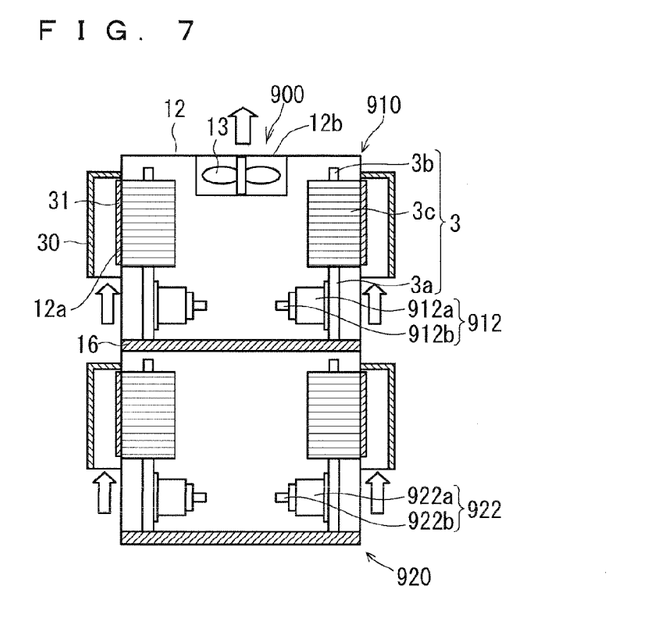
FIG. 7 is a cross-sectional view showing a light source device according to a comparative example.
Figure 8:
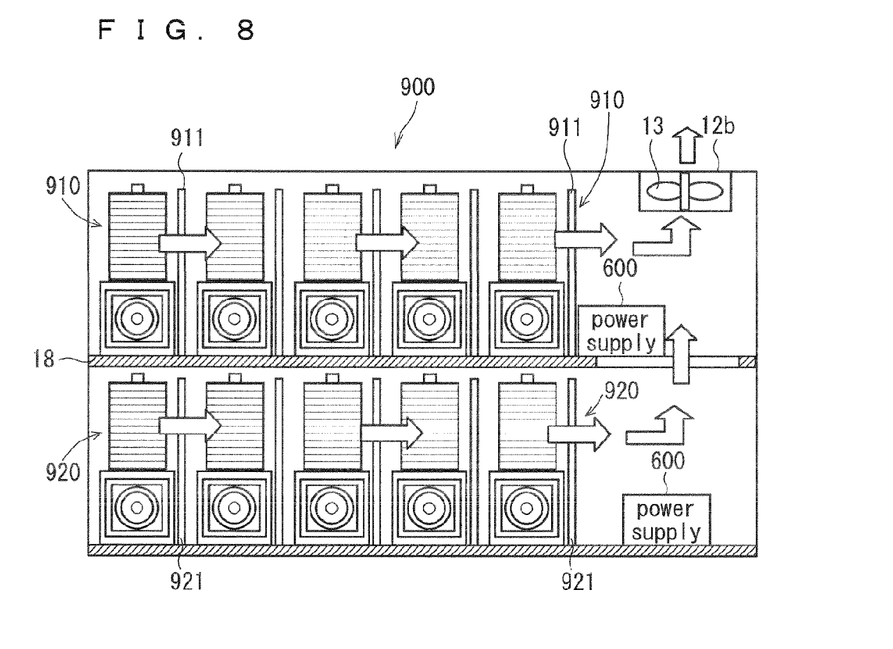
FIG. 8 is a longitudinal sectional view showing the light source device according to the comparative example.

Next, an advantage of the light source device 500 according to the present preferred embodiment will be described in comparison with a light source device 900 according to a comparative example which has another structure. FIGS. 7 and 8 are a cross-sectional view and a longitudinal sectional view showing the light source device 900 according to the comparative example. FIG. 7 corresponds to FIG. 1 and FIG. 8 corresponds to FIG. 2.

In the light source device 900, ten first light source units 910 are disposed in an upper stage portion and ten second light source units 920 are disposed in a lower stage portion in an outer housing 12. The respective light source units 910 and 920 have the same structures as the first and second light source units 70 and 80 according to the present preferred embodiment. The first light source unit 910 includes a first light source member 912 for outputting a red laser, for example, a heat pipe unit 3 for cooling the first light source member 912, and a first driving substrate 911. The first light source member 912 is constituted by a first light source body portion 912a having a light emitting device for emitting red light, for example, and a first light source tip portion 912b for outputting the red light generated by the first light source body portion 912a.

Moreover, the second light source unit 920 includes a second light source member 922 for outputting a green laser, for example, a heat pipe unit 3 for cooling the second light source member 922, and a second driving substrate 921. The second light source member 922 is constituted by a second light source body portion 922a having a light emitting device for emitting green light, for example, and a second light source tip portion 922b for outputting the green light generated by the second light source body portion 922a.

Figure 9:
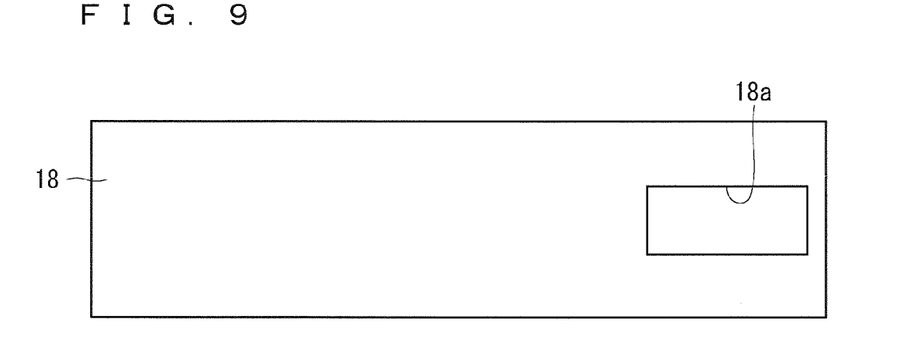
FIG. 9 is a plan view showing a partitioning member of the light source device according to the comparative example.
Figure 10:
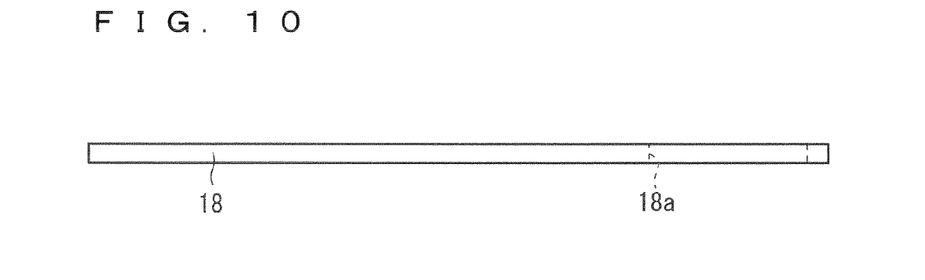
FIG. 10 is a side view showing the partitioning member of the light source device according to the comparative example.

FIGS. 9 and 10 are plan and side views showing a partitioning member 18 of the light source device 900 according to the comparative example. As shown in FIGS. 9 and 10, in the light source device 900, an opening portion 18a for leading heat discharged from the lower stage portion to the upper stage portion is not formed along the arrangement of the first light source unit 910 in the partitioning member 18 but is present on only an end thereof. Furthermore, an opening portion 12a for discharging heat and a cooling fan 13 are provided almost above the opening portion 18a of the partitioning member 18 in the outer housing 12.

In the light source device 900 according to the comparative example which has the structure, when the cooling fan 13 is rotated, cooling air passes through an opening portion 30a on a bottom face of a shade cover 30 attached to a surface of the outer housing 12 and is then fed into the outer housing 12 from a filter 31 and the opening portions 12a. In the upper stage portion, the cooling air taken into the outer housing 12 passes through a portion between fins 3c of the heat pipe unit 3 by propulsive force of the cooling fan 13 and then flows along a central part in a longitudinal direction of the outer housing 12 in which the light source units 910 are arranged, and is thereafter discharged from a discharge opening portion 12b provided on an end of the outer housing 12 to an outside of the outer housing 12.

In the lower stage portion, moreover, the cooling air taken into the outer housing 12 passes through the portion between the fins 3c of the heat pipe unit 3 by the propulsive force of the cooling fan 13, then flows along the central part in the longitudinal direction in which the light source units 920 are arranged, enters the upper stage portion via the opening portion 18a provided on the end of the partitioning member 18, and is thereafter discharged to the outside through the discharge opening portion 12b. Thus, the light source members 912 and 922 of the light source units 910 and 920 are cooled in the light source device 900 according to the comparative example.

The light source device 900 according to the comparative example has the structure in which the cooling air passing through the portion between the fins 3c of the heat pipe units 3 flows in the longitudinal direction of the outer housing 12 as described above. For this reason, it is necessary to feed a large amount of flow to a relatively small sectional area in the outer housing 12. As a result, a flow rate therebetween is increased so that a pressure loss in a fluid system for discharging heat is increased. For this reason, there is required a blower having a high static pressure property for the cooling fan 13. Consequently, there is a problem in that electric power consumed by the blower is increased and a dimension of the blower is enlarged. Moreover, a noise of the cooling fan 13 is also increased relatively so that a problem is caused in respect of performance.

On the other hand, in the light source device 500 according to the present preferred embodiment, the opening portion 16a (the air duct) having a large sectional area is provided along the arrangement of the first light source unit 70 in the longitudinal direction of the outer housing 12 with respect to the partitioning member 16 disposed between the upper stage portion and the lower stage portion in the structures of the first light source unit 70 disposed in the upper stage portion and the second light source unit 80 disposed in the lower stage portion. Therefore, the cooling air taken from the outside flows from the lower stage portion to the upper stage portion through the opening portion 16a having the large sectional area. Thus, the cooling air flows for the large sectional area in the air duct of the outer housing 12. Consequently, a pressure loss in the air duct of the outer housing 12 is reduced so that a cooling efficiency can be enhanced.

Moreover, the cooling fan 13 for taking the cooling air into the outer housing 12 through the opening portion 12a is provided in the outer housing 12. Therefore, the cooling air can be caused to flow efficiently, and furthermore, a pressure loss in the air duct of the outer housing 12 can be reduced. Consequently, the load of the cooling fan 13 is reduced so that the cooling air can be caused to flow still more efficiently.

Moreover, there is an advantage that the electric power consumed by the cooling fan 13 is reduced and the size of the cooling fan 13 is also decreased, and the noise of the cooling fan 13 can also be reduced. With the effect, furthermore, it is possible to produce effects such as reduction in a size and enhancement in durability of the light source device 500, reduction in energy consumption and decrease in an environmental load in each stage in a life cycle of a product.

In the present preferred embodiment, the discharge opening portion 12b and the cooling fan 13 are provided in almost the central part of the top plate of the outer housing 12. Also in the case in which they are provided on the end in the longitudinal direction of the outer housing 12, however, the same effect can be obtained.

Second Preferred Embodiment

Figure 11:
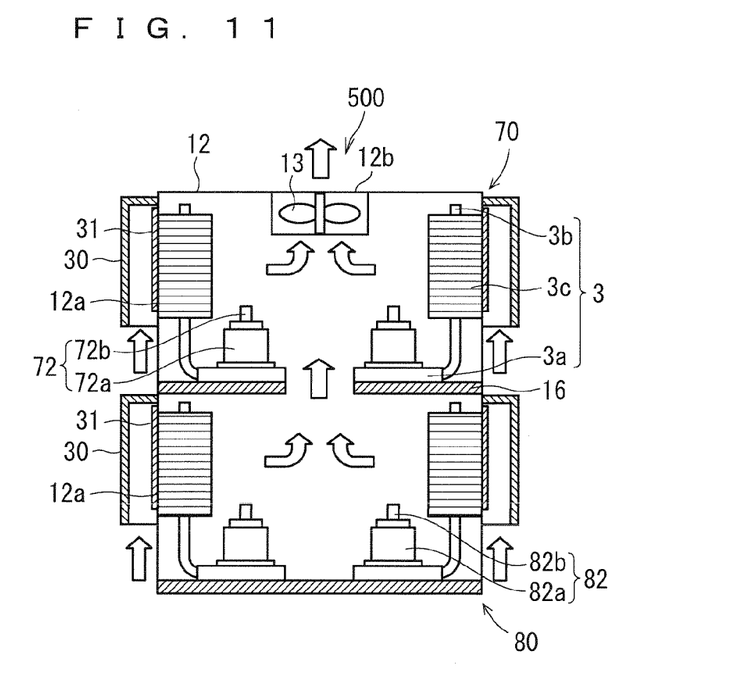
FIG. 11 is a cross-sectional view showing a light source device according to a second preferred embodiment.
Figure 12:
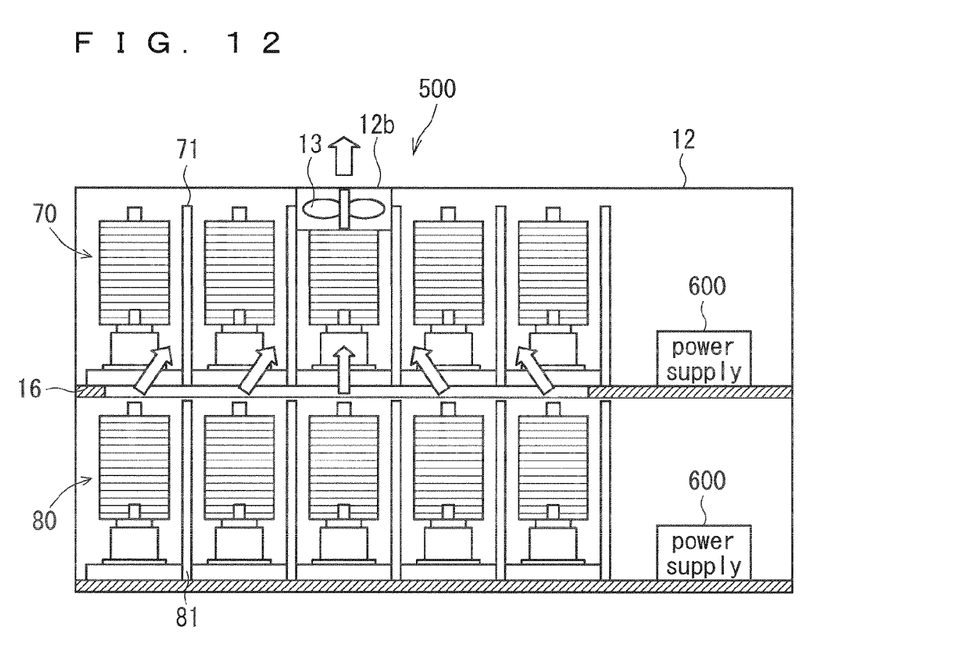
FIG. 12 is a longitudinal sectional view showing the light source device according to the second preferred embodiment.

Next, a light source device 500 according to a second preferred embodiment will be described. FIGS. 11 and 12 are a cross-sectional view and a longitudinal sectional view showing the light source device 500 according to the second preferred embodiment. In the second preferred embodiment, the same components as those described in the preferred embodiment have the same reference numerals and explanation will be omitted.

In the light source device 500 according to the second preferred embodiment, a heat pipe 3b is bent at approximately 90 degrees in a middle portion. As a result, a heat block 3a is disposed in almost parallel with a partitioning member 16. By employing the structure, there is a possibility that a width of an outer housing 12 might be increased. However, it is possible to produce an advantage that a height can be reduced.

Third Preferred Embodiment

Figure 13:
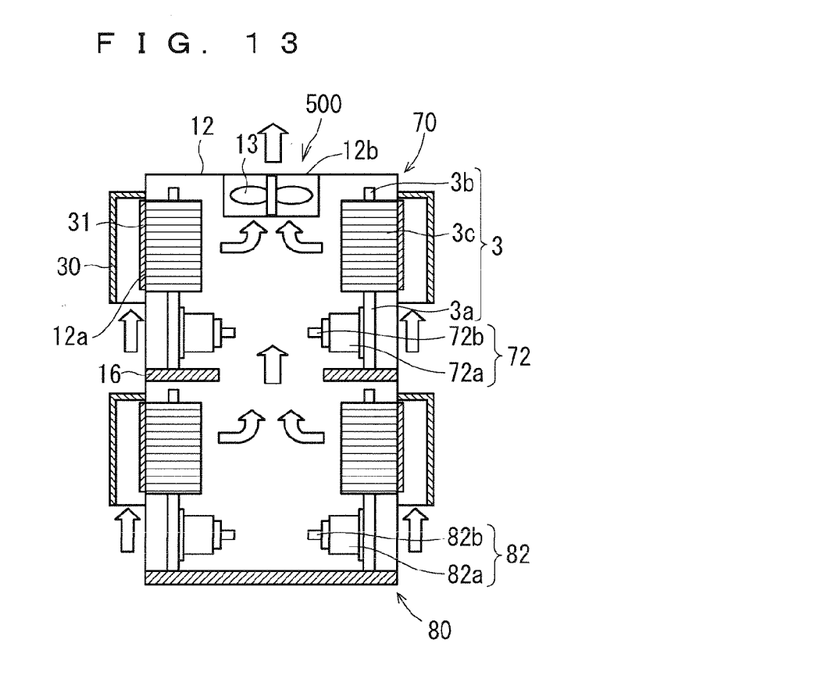
FIG. 13 is a cross-sectional view showing a light source device according to a third preferred embodiment.
Figure 14:
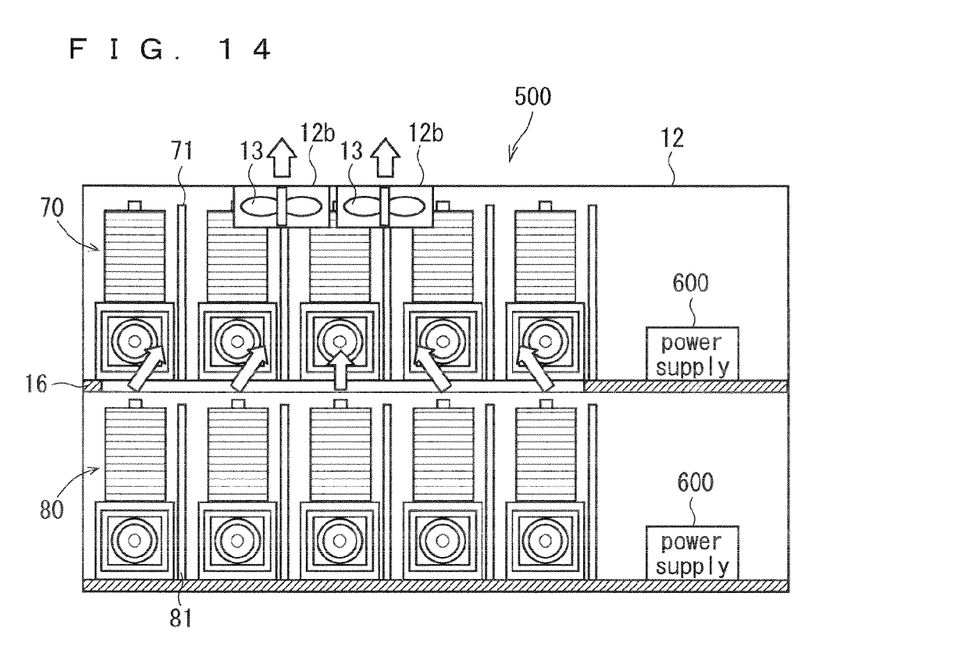
FIG. 14 is a longitudinal sectional view showing the light source device according to the third preferred embodiment.

Next, a light source device 500 according to a third preferred embodiment will be described. FIGS. 13 and 14 are a cross-sectional view and a longitudinal sectional view showing the light source 500 according to the third preferred embodiment, respectively. In the third preferred embodiment, the same components as those described in the preferred embodiments have the same reference numerals and explanation will be omitted.

The light source device 500 according to the third preferred embodiment is provided with two cooling fans 13. In the case in which the two cooling fans 13 are provided, there is obtained a characteristic that a maximum static pressure of the cooling fans 13 is not changed but only an air amount is doubled. In this case, it is possible to increase a flow rate of cooling air depending on a margin of a static pressure property. Consequently, it is possible to increase a cooling capability in a heat pipe unit 3. In the case in which a pressure loss of a fluid system is sufficiently lower than the static pressure property of the cooling fan 13, it is possible to increase the flow rate of the cooling air to be a little less than a double at a maximum by increasing the number of the fans up to two. In that case, the pressure loss loaded into the cooling fan 13 is increased to be a little less than four times at a maximum.

Fourth Preferred Embodiment

Figure 15:
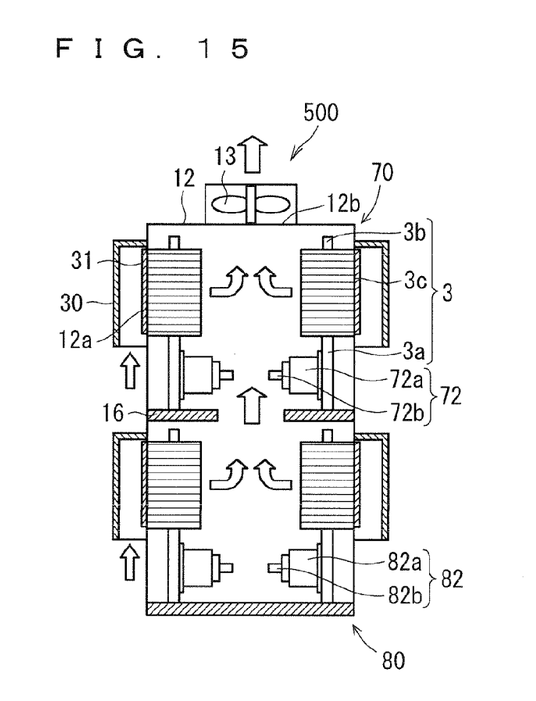
FIG. 15 is a cross-sectional view showing a light source device according to a fourth preferred embodiment.
Figure 16:
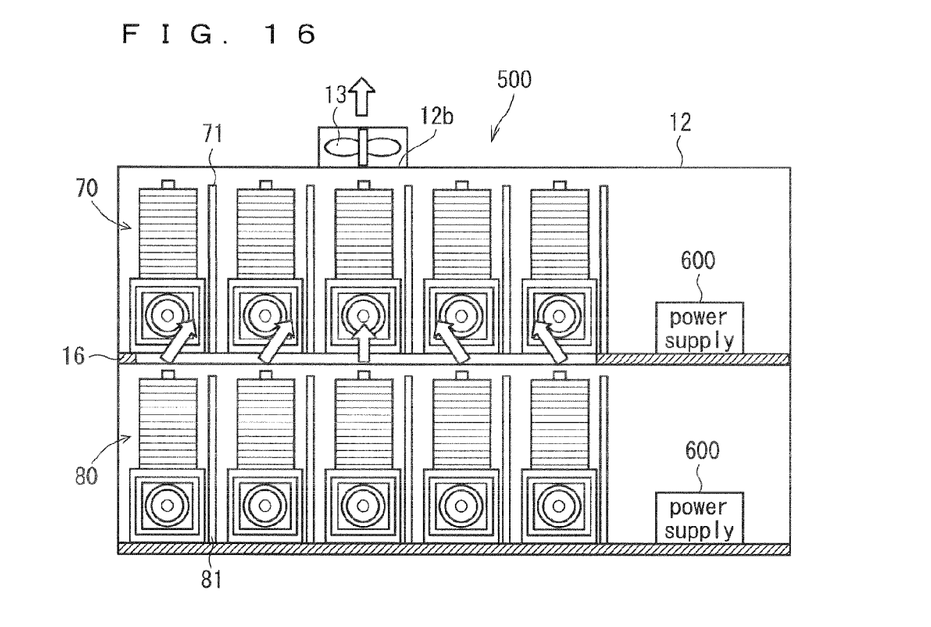
FIG. 16 is a longitudinal sectional view showing the light source device according to the fourth preferred embodiment.

Next, a light source 500 according to a fourth preferred embodiment will be described. FIGS. 15 and 16 are a cross-sectional view and a longitudinal sectional view showing the light source device 500 according to the fourth preferred embodiment, respectively. In the fourth preferred embodiment, the same components as those described in the preferred embodiments have the same reference numerals and explanation will be omitted.

In the light source device 500 according to the fourth preferred embodiment, a cooling fan 13 is provided on an outside of an outer housing 12. By providing the cooling fan 13 on the outside of the outer housing 12, it is possible to produce an advantage that a height of the outer housing 12 can be reduced, and furthermore, a width of the outer housing 12 can be decreased. In that case, the cooling fan 13 is disposed on a top plate of the outer housing 12, for example. In the case in which an exhaust duct is provided as a building facility and heat is not discharged to the surroundings, however, a space is originally taken by the exhaust duct and there is no problem.

Fifth Preferred Embodiment

Figure 17:
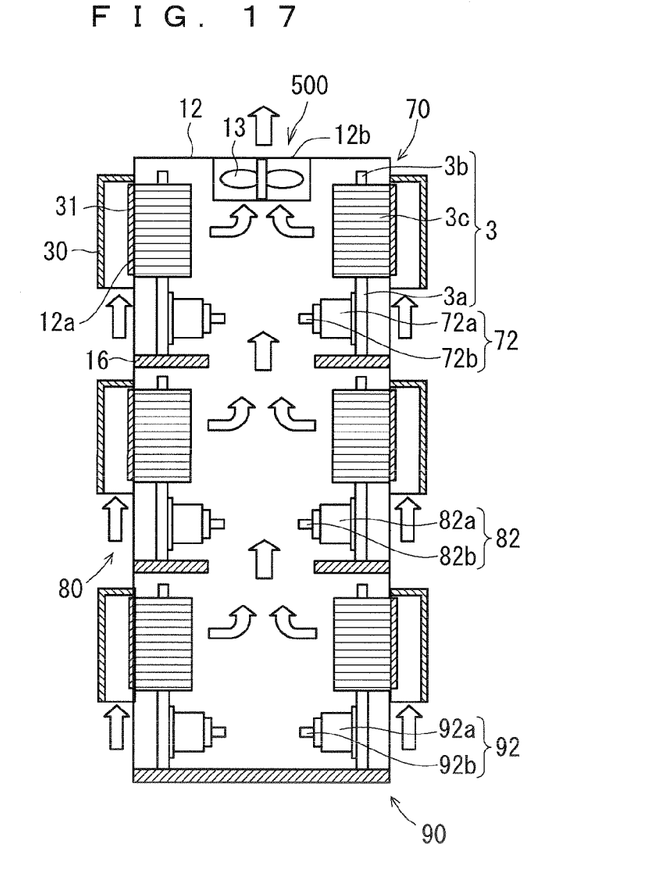
FIG. 17 is a cross-sectional view showing a light source device according to a fifth preferred embodiment.
Figure 18:
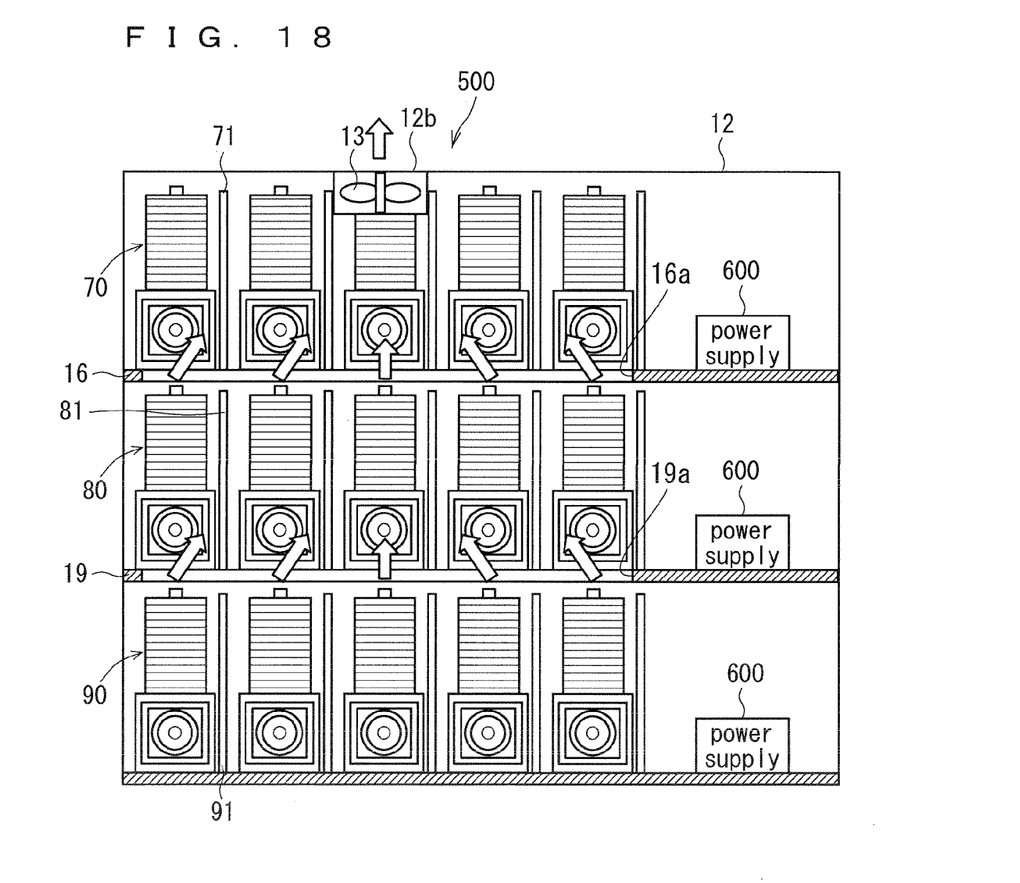
FIG. 18 is a longitudinal sectional view showing the light source device according to the fifth preferred embodiment.

Next, a light source device 500 according to a fifth preferred embodiment will be described. FIGS. 17 and 18 are a cross-sectional view and a longitudinal sectional view showing the light source device 500 according to the fifth preferred embodiment, respectively. In the fifth preferred embodiment, the same components as those described in the preferred embodiments have the same reference numerals and explanation will be omitted.

There will be described an example in which the light source device 500 according to the fifth preferred embodiment has a three-stage structure. A first light source unit 70, a second light source unit 80 and a third light source unit 90 are disposed in upper, middle and lower stage portions, respectively.

A partitioning member 19 having an opening portion 19a (a second opening portion) in a longitudinal direction is disposed between the middle and lower stage portions. In the same manner as the opening portion 16a formed on the partitioning member 16, the opening portion 19a is provided along the arrangement of the second light source units 80 in the partitioning member 19.

The third light source unit 90 includes a third light source member 92 for outputting a blue laser, for example, a heat pipe unit 3 (a cooling body) for cooling the third light source member 92, and a third driving substrate 91 provided with a driving circuit (not shown).

The third light source member 92 is constituted by a third light source body portion 92a having a light emitting device for emitting blue light, for example, and a third light source tip portion 92b for outputting the blue light generated by the third light source body portion 92a. The light emitting device provided in the third light source body portion 92a is a laser device, for example. The light emitting device may be a light emitting diode. An optical fiber or the like may be attached to the third light source tip portion 92b.

Also in the present preferred embodiment, since a large sectional area of a flow path is ensured in the opening portions 16a and 19a in the longitudinal direction of the outer housing 12, it is possible to almost minimize a pressure loss of a flow path in a process in which cooling air flows into the upper stage portion from the middle stage portion and the lower stage portion.

Variant of First to Fifth Preferred Embodiments

Next, a variant of the first to fifth preferred embodiments will be described. In the preferred embodiments, the shade cover 30 is provided on the opening portion 12a. The reason is that light in the outer housing 12 is to be prevented from leaking to the outside when the optical fiber for carrying out a connection to the first light source tip portion 72b or the second light source tip portion 82b is removed by mistake, for example. For this reason, if the connection of the light source tip portions 72b and 82b to the optical fiber is strong, the shade cover 30 is not required and is not an essential requirement for the present invention.

Moreover, the optical fiber is not an essential requirement. It is apparent that the present invention is effective for a light source device for synthesizing light emitted from light source materials by using an optical system, for example.

Furthermore, the first light source unit 70, the second light source unit 80 and the third light source unit 90 may be red light sources, green light sources or blue light sources which have the same structure, for example, and these may be mixed in the same stage.

Although the first driving substrate 71 and the second driving substrate 81 are provided for the first light source unit 70 and the second light source unit 80 respectively in the preferred embodiments, moreover, the first driving substrate 71 does not need to be provided in the first light source unit 70 and the second driving substrate 81 does not need to be provided in the second light source unit 80.

Although the first light source unit 70 includes the first driving substrate 71 provided with the driving circuit for driving the first light source member 72, furthermore, the first driving substrate 71 may be attached to a plate-shaped member (not shown) with a heat conducting member interposed therebetween. More specifically, a heat conducting sheet (a heat conducting member) is stuck onto an electronic component which is provided on the first driving substrate 71 and has a temperature raised during an operation, and the first driving substrate 71 is attached to the plate-shaped member in a state in which the heat conducting sheet is pushed against the plate-shaped member. The plate-shaped member is attached to the heat pipe unit 3. Therefore, the first driving substrate 5 and the heat pipe unit 3 are thermally connected to each other. Consequently, it is possible to cool the first driving substrate 71 including the driving circuit by utilizing the heat pipe unit 3. The second driving substrate 81 and the third driving substrate 91 may also be attached to the plate-shaped member with the heat conducting member interposed therebetween.

According to the present invention, the respective preferred embodiments can freely be combined or can be changed and omitted properly without departing from the scope of the invention.

While the invention has been shown and described in detail, the foregoing description is in all aspects illustrative and not restrictive. It is therefore understood that numerous modifications and variations can be devised without departing from the scope of the invention.

What is claimed is:

1. A light source device comprising:
   an outer housing;
   a partitioning member forming a multi-stage structure in said outer housing and disposed between an upper stage and a lower stage adjacent to said upper stage;
   a plurality of light source units disposed in respective stages of said outer housing, each of which has a light source member and a cooling body for cooling said light source member;
   a plurality of first opening portions formed on said outer housing so as to be adjacent to each of said plurality of light source units, for taking air acting as cooling air to be supplied to said cooling body from an outer part of said outer housing into an inner part thereof, each of the plurality of first opening portions having a filter attached thereto and being covered by a shade element which includes a top portion and a side portion and attached to said outer housing at said side portion, said top portion being perpendicular to said outer housing and said side portion being parallel to said outer housing; and
   a second opening portion formed along arrangement of said light source units in said partitioning member such that air flows from said lower stage through said upper stage.

2. The light source device according to claim 1, wherein said light source units further include a driving circuit for driving said light source member.

3. The light source device according to claim 1, wherein a cooling fan for taking said cooling air into said outer housing through said first opening portion is provided in said outer housing.

4. The light source device according to claim 1, wherein a cooling fan for taking said cooling air into said outer housing through said first opening portion is provided on an outside of said outer housing.

* * * * *